(12) United States Patent
Kim et al.

(10) Patent No.: US 8,277,995 B2
(45) Date of Patent: Oct. 2, 2012

(54) FUEL CELL POWER GENERATION SYSTEM

(75) Inventors: Sung-Han Kim, Seoul (KR); Jae-Hyuk Jang, Seoul (KR); Bo-Sung Ku, Suwon-si (KR); Craig Matthew Miesse, Seoul (KR); Hye-Yeon Cha, Yongin-si (KR); Eon-Soo Lee, Gyeongsangbuk-do (KR); Jae-Hyoung Gil, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 723 days.

(21) Appl. No.: 12/428,060

(22) Filed: Apr. 22, 2009

(65) Prior Publication Data

US 2010/0062300 A1 Mar. 11, 2010

(30) Foreign Application Priority Data

Sep. 9, 2008 (KR) .......................... 10-2008-0088887

(51) Int. Cl.
*H01M 8/04* (2006.01)

(52) U.S. Cl. ........ 429/434; 429/436; 429/452; 429/459; 429/483

(58) Field of Classification Search .................. 429/175, 429/246, 413, 454–456, 462, 512, 434, 436, 429/452, 459, 483
See application file for complete search history.

(56) References Cited

U.S. PATENT DOCUMENTS

| | | | | |
|---|---|---|---|---|
| 3,004,130 | A * | 10/1961 | Miller | 219/202 |
| 5,763,114 | A * | 6/1998 | Khandkar et al. | 429/423 |
| 6,057,051 | A * | 5/2000 | Uchida et al. | 429/414 |
| 6,194,092 | B1 * | 2/2001 | Ohara et al. | 429/9 |
| 7,273,672 | B2 * | 9/2007 | Sone et al. | 429/450 |
| 7,709,114 | B2 * | 5/2010 | Hatta et al. | 429/7 |
| 2003/0215684 | A1 * | 11/2003 | Yang et al. | 429/26 |
| 2004/0028966 | A1 * | 2/2004 | Hibbs et al. | 429/21 |
| 2005/0269675 | A1 * | 12/2005 | Prindiville | 257/666 |
| 2006/0054209 | A1 * | 3/2006 | Hulen | 136/205 |

(Continued)

FOREIGN PATENT DOCUMENTS

| | | |
|---|---|---|
| JP | 08-288604 A | 11/1996 |
| JP | 10-092456 A | 4/1998 |
| JP | 2006-202611 A | 8/2006 |
| WO | WO 97/27637 A1 | 7/1997 |

OTHER PUBLICATIONS

Korean Office Action issued in Korean Patent Application No. KR 10-2008-0088887 dated Jul. 30, 2010.

(Continued)

*Primary Examiner* — Joseph Drodge
(74) *Attorney, Agent, or Firm* — McDermott Will & Emery LLP

(57) ABSTRACT

A fuel cell power generation system is disclosed. The fuel cell power generation system in accordance with an embodiment of the present invention includes: a stack, which produces electrical energy by reacting hydrogen with oxygen and in which the hydrogen is supplied as fuel and the oxygen is in the air; a hydrogen tank, which supplies fuel comprising hydrogen to the stack; and a heat transfer tape, which transfers heat generated from the stack to the hydrogen tank. The fuel cell power generation system can improve the efficiency of supplying hydrogen by supplying waste heat generated from the stack to the hydrogen tank through the use of the heat transfer tape without a heat supplying device and be applied to a mobile device due to the reduced volume of the fuel cell power generation system.

8 Claims, 6 Drawing Sheets

U.S. PATENT DOCUMENTS

2007/0196702 A1* 8/2007 Sridhar et al. .................. 429/17
2008/0050627 A1* 2/2008 Winter et al. ................... 429/24
2008/0160383 A1* 7/2008 Shen et al. ...................... 429/34
2008/0176119 A1* 7/2008 Nakamura ...................... 429/20

OTHER PUBLICATIONS

Japanese Office Action, with partial English translation, issued in Japanese Patent Application No. 2009-107901, dated Jan. 31, 2012.

* cited by examiner

FUEL CELL POWER GENERATION SYSTEM

CROSS-REFERENCE TO RELATED APPLICATIONS

This application claims the benefit of Korean Patent Application No. 10-2008-0088887, filed with the Korean Intellectual Property Office on Sep. 9, 2008, the disclosure of which is incorporated herein by reference in its entirety.

BACKGROUND

1. Technical Field

The present invention relates to a fuel cell power generation system.

2. Description of the Related Art

A fuel cell power generation system produces electricity by electrochemically reacting both a fuel gas, such as methanol, including a large amount of hydrogen and air extracted from the atmosphere as an oxidizing agent at a gas diffusion electrode. Such an environmentally friendly fuel cell power generation system may serve as a clean energy source for solving global environmental problems caused by the use of fossil energy and the increased power demand.

The fuel cell power generation system combines a stack, on which a plurality of unit batteries for producing electricity are stacked, and a hydrogen tank, which supplies hydrogen as fuel to the stack.

The hydrogen tank is a part of a fuel supplying device that stores hydrogen in order to supply the hydrogen to the stack. Some methods of storing hydrogen include storing hydrogen through the use of a pressurized tank, storing liquid hydrogen at an extremely low temperature, storing hydrogen in a porous material such as a carbon nanotube (CNT) and storing hydrogen by using metal hydride, such as metal powder, having hydrogen absorption characteristics.

The method of storing hydrogen through the use of a pressurized tank stores hydrogen as a compressed gas at the pressure of at least 300 bar and thus requires a large volume and long-term stability, making it difficult to be employed in a small device such as a mobile device. Likewise, the technology of storing hydrogen as liquid hydrogen at an extremely low temperature also requires an additional device and a large volume, making it difficult to be employed in a mobile electronic device.

The method of storing hydrogen in a porous material such as a carbon nanotube (CNT) has an advantage of being simply implemented in small scale. However, there are practical difficulties in application since the relatively high pressure of over 100 bar is required and the amount of hydrogen being absorbed is too small for practical use.

A notable feature of the metal hydride is its ability to reversibly absorb and/or desorb hydrogen at a low temperature and pressure. The metal hydride has been of interest recently because of its potential as a hydrogen storage material for mobile devices. Therefore, a hydrogen tank using the metal hydrides is currently in the research and development phase.

FIG. 1 is a graph illustrating operating temperatures and pressures of various types of metal hydride, such as $NaAlH_4$, $LaNi_5H_5$, $MgH_2$, $Mg_2NiH_4$, $LaNi_4H_5$ and Li-Amide. At such operating temperatures and pressures, hydrogen can be absorbed into a space between metal hydride grids and desorbed from the space between the metal hydride grids when the operating pressure is lowered.

Among the kinds of metal hydride described above, if hydrogen can be absorbed and/or desorbed at room temperature, which is between 25 and 100 degrees Celsius, and room pressure, which is between 1 and 10 atm (the shaded box), the metal hydride may be appropriate for the manufacture of the fuel cell power generation system using the hydrogen tank for use in mobile devices because of the ability to operate without an external heat source or high-pressure hydrogen recharging. Nevertheless, when hydrogen is desorbed, the operating temperature is decreased unless hest is continuously supplied, and thus some hydrogen stored in the storage tank may not be used.

SUMMARY

The present invention provides a fuel cell power generation system that can improve the efficiency of supplying hydrogen by supplying waste heat generated from a stack to a hydrogen tank through the use of a heat transfer tape.

An aspect of the invention provides a fuel cell power generation system. The fuel cell power generation system in accordance with an embodiment of the present invention includes: a stack, which produces electrical energy by reacting hydrogen with oxygen and in which the hydrogen is supplied as fuel and the oxygen is in the air; a hydrogen tank, which supplies fuel comprising hydrogen to the stack; and a heat transfer tape, which transfers heat generated from the stack to the hydrogen tank.

The hydrogen tank can include metal hydride.

The stack can be in contact with the hydrogen tank, and the heat transfer tape can be interposed between the stack and the hydrogen tank and where the stack and the hydrogen tank are in contact.

A thermal conductive adhesive layer can be formed on at least one surface of the heat transfer tape, and the heat transfer tape can be a metal thin film.

The stack and the hydrogen tank can be disposed apart from each other, one side of the heat transfer tape can be in contact with the stack, and the other side of the heat transfer tape can be in contact with the hydrogen tank. Here, a thermal conductive adhesive layer can be formed on a surface of the heat transfer tape, in which the surface is in contact with the stack or the hydrogen tank. The heat transfer tape being used in this structure can block thermal conduction in a direction of thickness while allowing the thermal conduction lengthwise. The heat transfer tape can include graphite. A heat blocking layer can be further formed on an opposite surface of a surface of the heat transfer tape being in contact with the stack or the hydrogen tank.

The thermal conductive adhesive layer can include at least one selected from a group consisting of polyester, epoxy, amine and silicon.

Additional aspects and advantages of the present invention will be set forth in part in the description which follows, and in part will be obvious from the description, or may be learned by practice of the invention.

DETAILED DESCRIPTION

Figure 1:
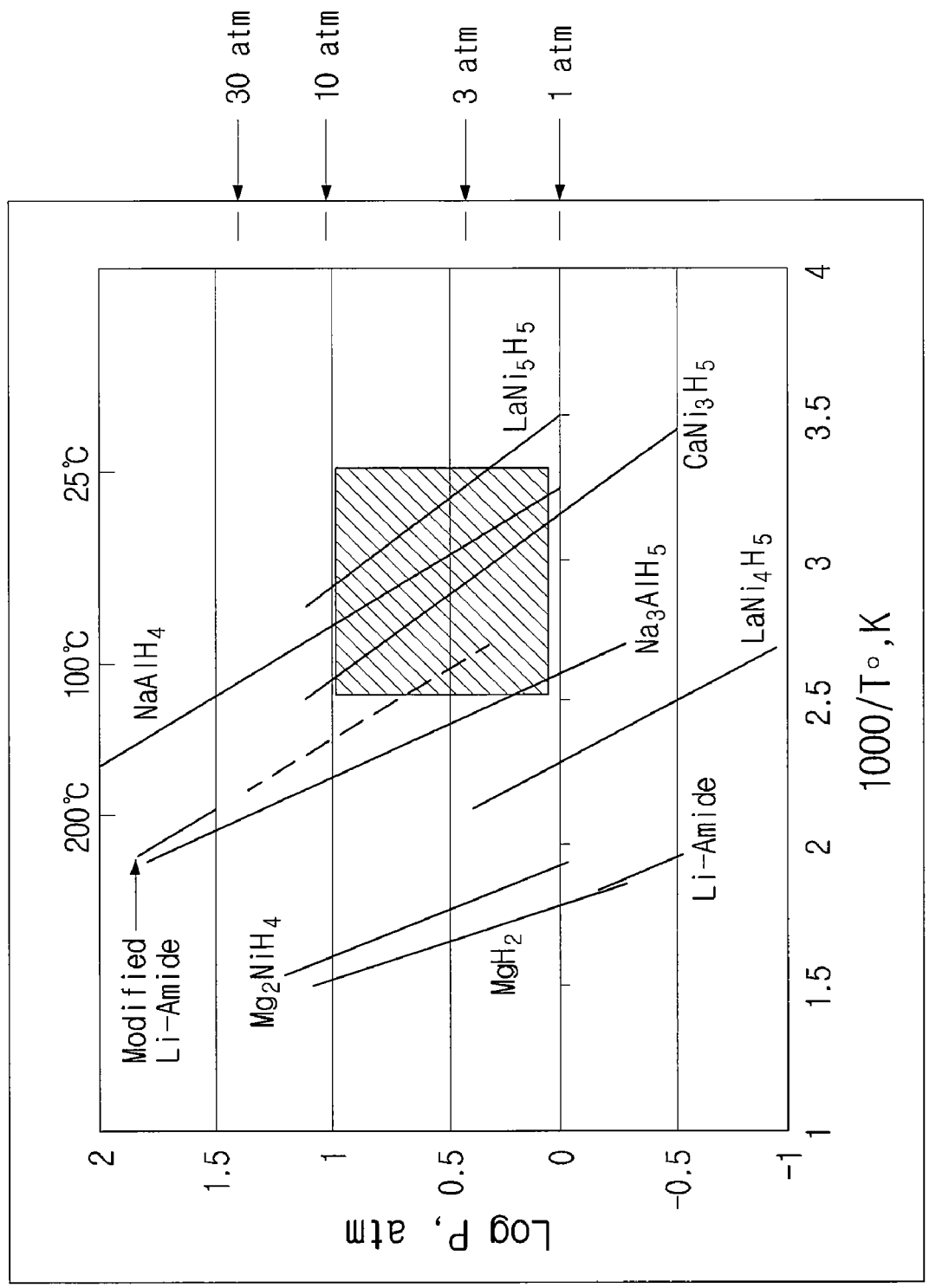
FIG. 1 is a graph illustrating operating temperatures and pressures in accordance with various types of metal hydride.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A method of manufacturing a fuel cell power generation system in accordance with certain embodiments of the present invention will be described below in more detail with reference to the accompanying drawings. Those components that are the same or are in correspondence are rendered the same reference numeral regardless of the figure number, and redundant explanations are omitted.

Figure 2:
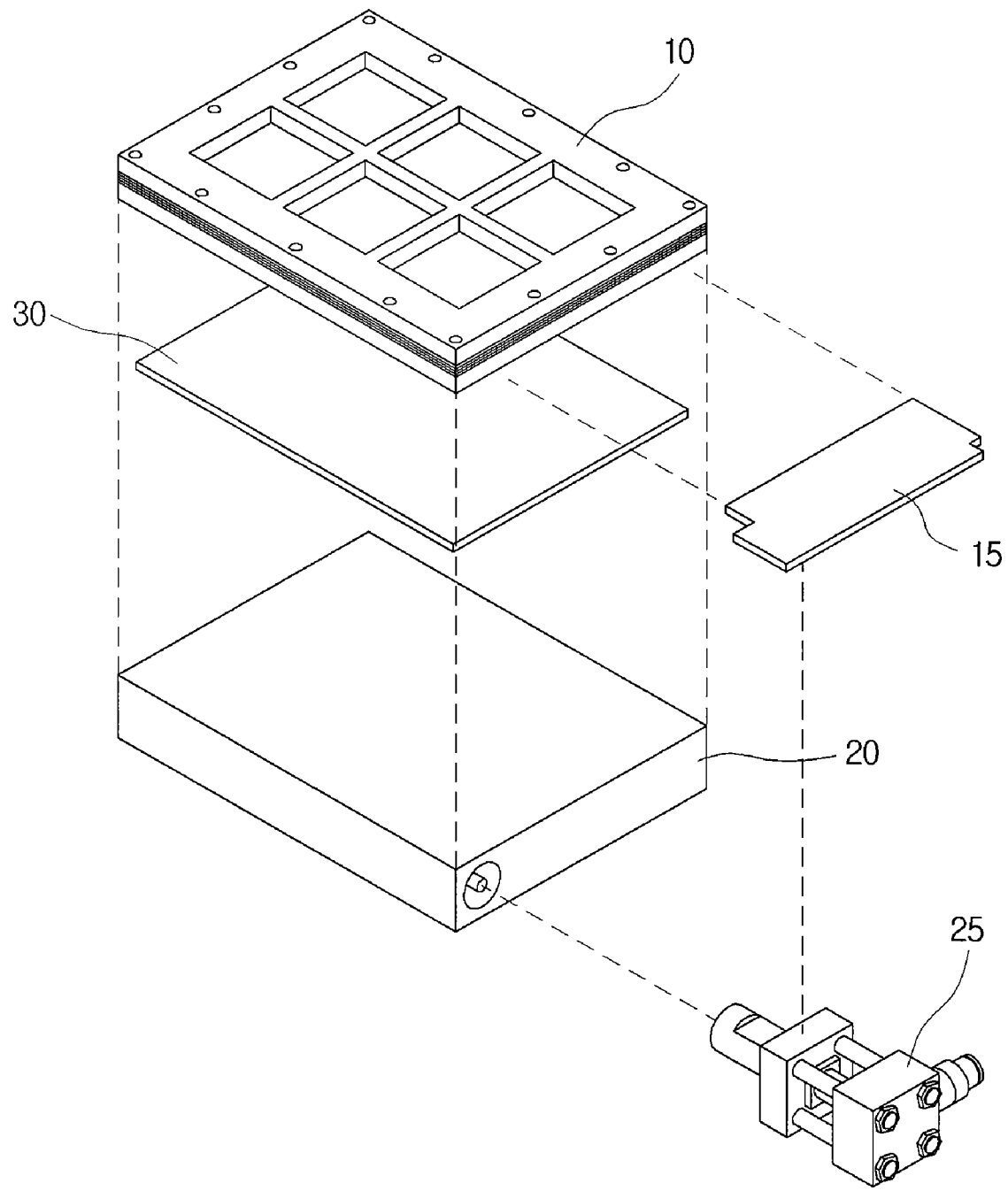
FIG. 2 is an exploded view illustrating a fuel cell power generation system in accordance with an embodiment of the present invention.

FIG. 2 is an exploded view illustrating a fuel cell power generation system in accordance with an embodiment of the present invention. Illustrated in FIG. 2 are a stack 10, a processing unit 15, a hydrogen tank 20, a manifold 25 and a heat transfer tape 30. The stack 10 used in a fuel cell is the main component that receives hydrogen as fuel from the hydrogen tank 20 and produces energy by separating the hydrogen.

The fuel cell stack 10, which is a device that uses hydrogen as fuel supplied from the hydrogen tank 20 to produce energy by separating hydrogen, includes a membrane electrode assembly (MEA, not shown), in which an electrolyte layer is interposed between an air electrode and a fuel electrode that produce energy. The stack 10 is constituted by an end plate (not shown), which is positioned at both ends of the stack and applies pressure to the stacking structure of the stack, and a current collector (not shown), which collects electrical energy produced from the membrane electrode assembly (MEA) and transfers the energy to an electronic device.

Hydrogen supplied to the fuel electrode of the stack 10 is separated into electrons and hydrogen ions, and the hydrogen ions travel to the air electrode through the electrolyte layer. Moreover, the electrons travel to the air electrode through an external circuit. At the air electrode, oxygen ions and hydrogen ions meet to create water. The reaction at the stack 10 can be represented by the following Reaction Scheme 1.

Fuel Electrode: $H_2 \rightarrow 2H^+ + 2e^-$

Air Electrode: $\frac{1}{2}O_2 + 2H^+ + 2e^- \rightarrow H_2O$

Overall Reaction: $H_2 + \frac{1}{2}O_2 \rightarrow H_2O$   [Reaction Scheme 1]

The reactions expressed in the chemical equation described above are exothermic reactions, thereby increasing the temperature of the stack 10 with the progress of the reaction.

The hydrogen tank 20 is a part of a fuel supplying device that stores hydrogen in order to supply the hydrogen to the stack 10. Some methods of storing hydrogen include storing hydrogen through the use of a pressurized tank, storing liquid hydrogen at an extremely low temperature, storing hydrogen in a porous material such as a carbon nanotube (CNT) and storing hydrogen by using metal hydride such as metal powder having hydrogen absorption characteristics.

Using the metal hydride, in particular, is highly efficient, but heat has to be supplied constantly during the operation, as described above. The present embodiment uses the heat created from the stack 10, and the heat transfer tape 30 is used in order to maintain the required temperature in the hydrogen tank 20.

In the case of the fuel cell power generation system illustrated in FIG. 2, the stack 10 is stacked on the hydrogen tank 20, and thus they are in contact, allowing the stack 10 to directly transfer heat from the stack 10 to the hydrogen tank 20. In order to further improve the heat transfer efficiency between them, the heat transfer tape 30 can be interposed between the hydrogen tank and the stack, in which case the heat transfer tape 30 has to effectively transfer thermal energy in the direction of thickness.

Figure 3:
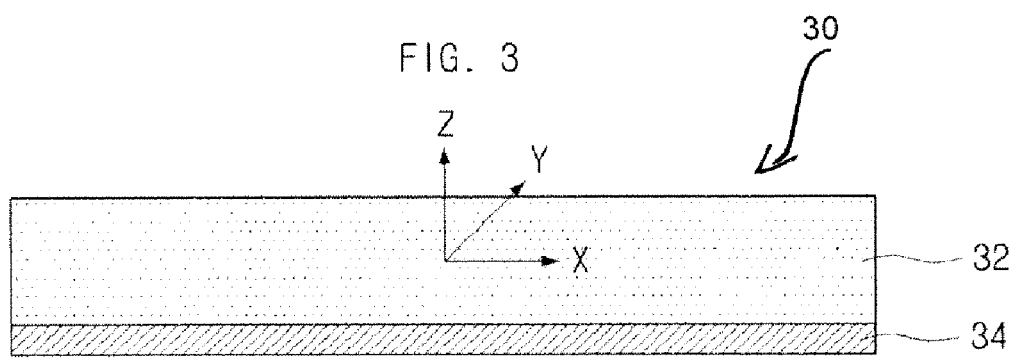
FIG. 3 is a cross-sectional view illustrating a heat transfer tape of a fuel cell power generation system in accordance with an embodiment of the present invention.

FIG. 3 is a cross-sectional view illustrating a heat transfer tape of a fuel cell power generation system in accordance with an embodiment of the present invention. Illustrated in FIG. 3 are a metal film 32 and a thermal conductive adhesive layer 34. The metal film 32 can be made of a thermal conductive material, such as aluminum (Al) and copper (Cu), and transfer the heat of the stack 10 to the hydrogen tank 20 due to the characteristic of transferring thermal energy in all directions (x, y and z directions).

By forming the thermal conductive adhesive layer 34 on one surface or both surfaces of the metal film 32, the stack 10 and the hydrogen tank 20 can be tightly contacted, thereby improving the thermal conductive efficiency. The thermal conductive adhesive layer is a thin layer of a thermal conductive substance (metal powder or carbon nanotube) with adhesive characteristics, in which at least one of polyester, epoxy, amine and silicon is included.

The manifold 25 is a device connected to the hydrogen tank 20 and the stack 10 and supplies hydrogen received from the hydrogen tank 20 to the stack 20. Moreover, the manifold lowers the pressure of hydrogen supplied from the hydrogen tank 20 and provides the hydrogen to the stack 10.

The processing unit 15 is connected with the stack 10 and controls an output voltage by DC/DC converting, i.e. increasing or decreasing the voltage, a source of direct current (DC) generated from the stack 10.

Figure 4:
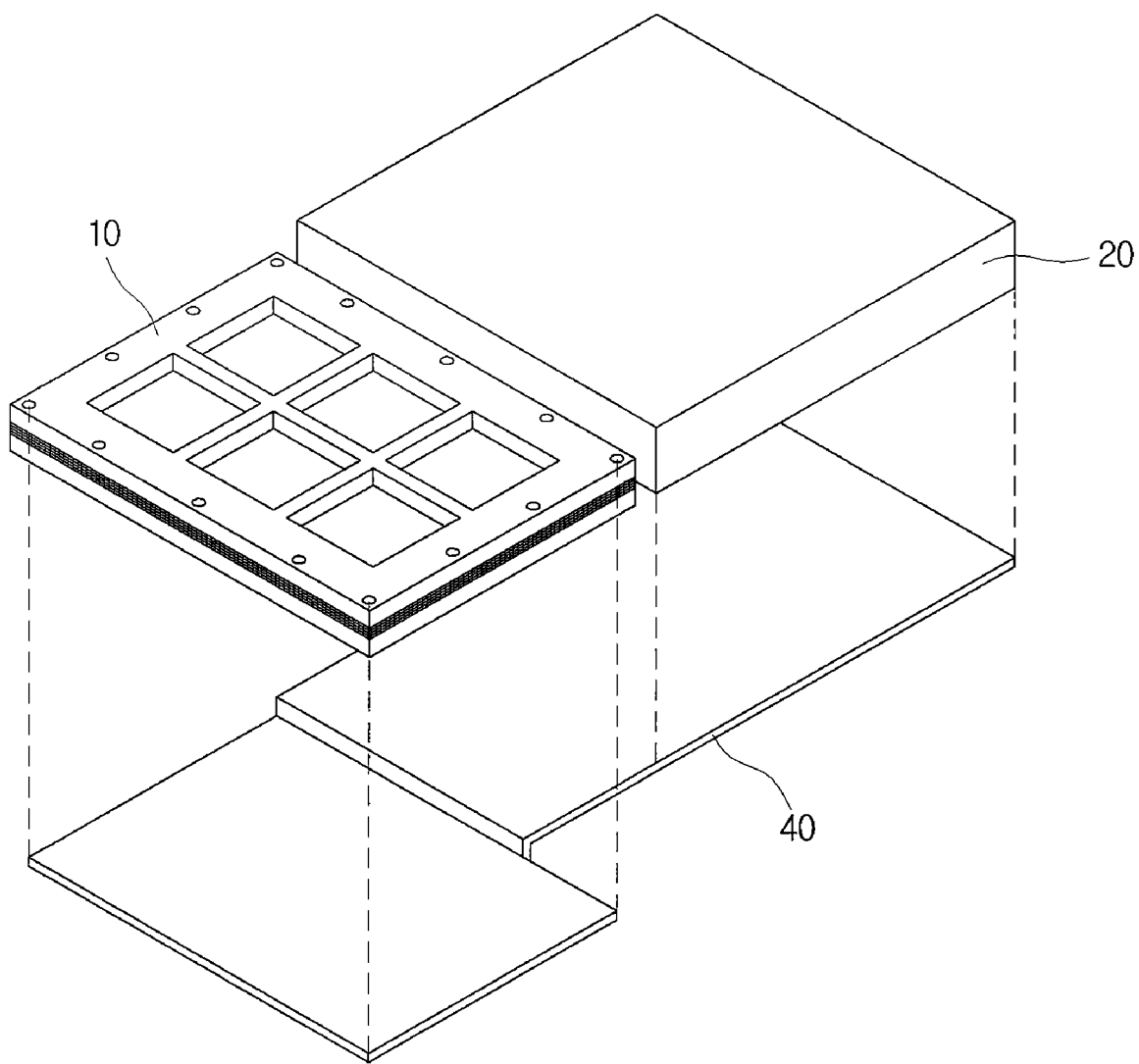
FIG. 4 is an exploded view illustrating a fuel cell power generation system in accordance with another embodiment of the present invention.

FIG. 4 is an exploded view illustrating a fuel cell power generation system in accordance with another embodiment of the present invention. Illustrated in FIG. 4 are the stack 10, the processing unit 15, the hydrogen tank 20, the manifold 25 and a heat transfer tape 40.

Unlike the embodiment described above, the stack 10 and the hydrogen tank 20 are spaced from each other without being in contact, as illustrated in FIG. 4. In this case, since the heat of the stack 10 cannot be transferred directly to the hydrogen tank 20, an alternative medium for heat transfer is needed. In the case of the present embodiment, the heat transfer tape 40 is used to transfer the waste heat of the stack 10 to the hydrogen tank 20.

Figure 5:
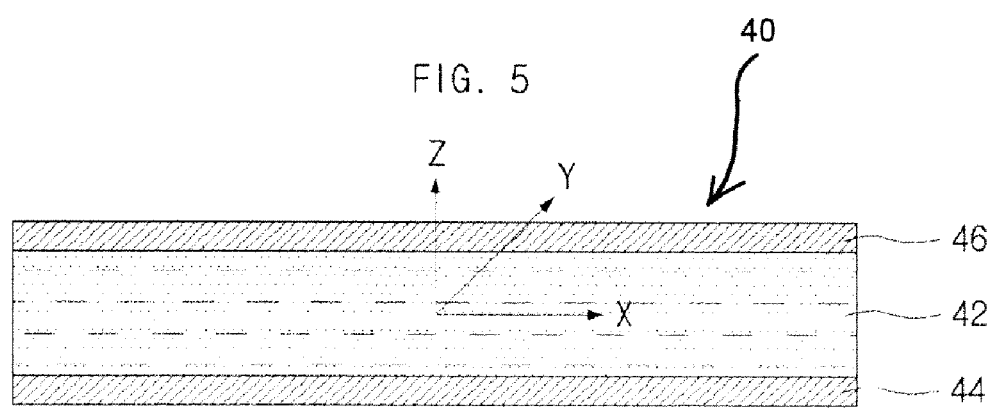
FIG. 5 is a cross-sectional view illustrating a heat transfer tape of a fuel cell power generation system in accordance with another embodiment of the present invention.

FIG. 5 is a cross-sectional view illustrating the heat transfer tape 40 used in a fuel cell power generation system in accordance with another embodiment of the present invention. Illustrated in FIG. 5 are a heat transfer layer 42, a thermal conductive adhesive layer 44 and a heat blocking layer 46. In this embodiment, the heat transfer tape 40 has to effectively transfer thermal energy.

An example of the heat transfer layer 42 that can be used is graphite, which is a layered compound composed mostly of carbon atoms. In each layer, the carbon atoms are arranged in a hexagonal lattice, of which the configuration is similar to a benzene ring. Three electrons in a carbon atom form a covalent bond on a plane, and one electron is coupled to an upper layer and a lower layer. Because of this atomic structure, graphite has an thermal anisotropic property, i.e., heat conduction can occur more easily in the thickness direction (z-axis direction) than the horizontal direction (x-axis and y-axis directions). The thermal conductivity and direction of graphite compared with those of metal are represented in the following Table 1.

TABLE 1

Comparison of anisotropic thermal conductivity of graphite and metals

| Property | Direction | Graphite | Aluminum alloy | Copper alloy |
| --- | --- | --- | --- | --- |
| Density | | 1.1~1.7 | 2.71 | 8.89 |
| Thermal Conduction Rate (W/mK) | Horizontal Direction (xy) | 140~500 | 220 | 388 |
| Thermal Conductivity (W/mK) | Thickness Direction (z) | 3~10 | 220 | 385 |

Referring to Table 1, metals such as aluminum and copper show very similar results in thermal conductivity regardless of the directions, but the thermal conductivity of graphite in the horizontal direction is 50 times greater than that of the thickness direction.

In other words, if graphite is used as the heat transfer layer 42, the heat absorbed from the stack 10 can be transferred to the hydrogen tank 20 without being lost by radiation along the way because graphite does not allow the heat to be transferred in the thickness direction. In order to improve the efficiency of heat transfer, the thermal conductive adhesive layer 44 can be formed on a surface that is in contact with the stack 10 or the hydrogen tank 20 such that the thermal conductive adhesive layer 44 is in direct contact with a surface of the stack 10 or the hydrogen tank 20, thus absorbing the heat from the stack 10 and radiating the heat to the hydrogen tank 20. Moreover, the heat blocking layer 46 can be formed on the other surface of the heat transfer layer 42, preventing heat loss.

Since the stack 10, the processing unit 15, the hydrogen tank 20 and the manifold 25 have been described in the present embodiment above, a further description will be omitted.

Figure 6:
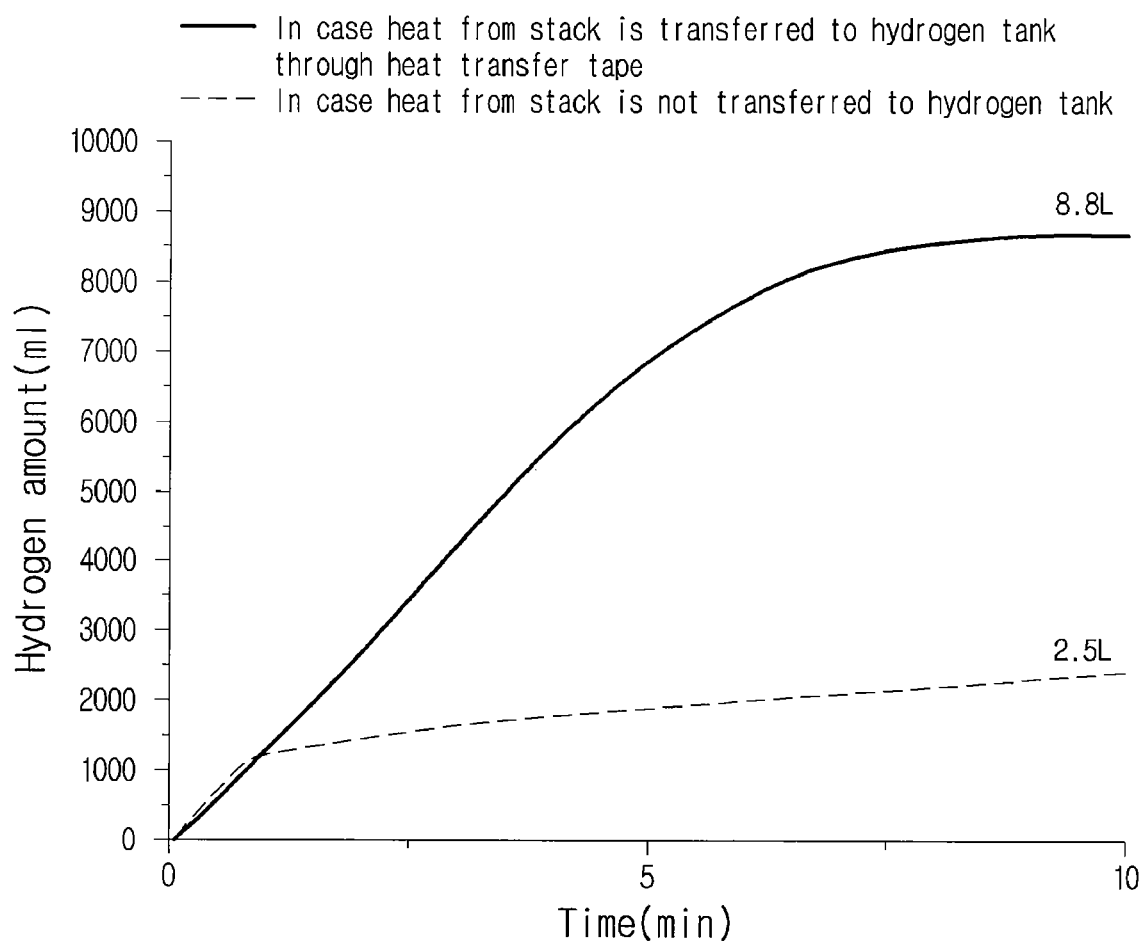
FIG. 6 is a graph illustrating emission of hydrogen in a fuel cell power generation system using a heat transfer tape in accordance with another embodiment of the present invention.

While using the heat transfer tapes 30 and 40 described above, the temperature of the hydrogen tank can be maintained by using the waste heat generated from the stack, making it easier to improve the efficiency of emitting hydrogen in small scale without any other heat supplying device to emit hydrogen from the hydrogen tank. FIG. 6 is a graph illustrating the emission of hydrogen when the heat transfer tape is used (solid line) and when no heat transfer tape is used (dotted line). The results show that hydrogen can be more effectively emitted from the hydrogen tank when the heat transfer tape is used.

While the spirit of the invention has been described in detail with reference to certain embodiments, the embodiments are for illustrative purposes only and shall not limit the invention. It is to be appreciated that those skilled in the art can change or modify the embodiments without departing from the scope and spirit of the invention. As such, many embodiments other than those set forth above can be found in the appended claims.

What is claimed is:

1. A fuel cell power generation system comprising:
   a stack configured to produce electrical energy by reacting hydrogen with oxygen, the hydrogen being supplied as fuel and the oxygen being in the air;
   a hydrogen tank configured to supply fuel comprising hydrogen to the stack; and
   a heat transfer tape having two opposed sides and configured to transfer heat generated from the stack to the hydrogen tank,
   wherein the stack and the hydrogen tank are disposed apart from each other,
   one side of the heat transfer tape faces and is in contact with the stack, and
   the other side of the heat transfer tape faces and is in contact with the hydrogen tank.

2. The fuel cell power generation system of claim 1, wherein the hydrogen tank comprises metal hydride.

3. The fuel cell power generation system of claim 1, wherein the heat transfer tape is a metal thin film.

4. The fuel cell power generation system of claim 1, wherein a thermal conductive adhesive layer is formed on a surface of the heat transfer tape, the surface being in contact with the stack or the hydrogen tank.

5. The fuel cell power generation system of claim 4, wherein the thermal conductive adhesive layer comprises at least one selected from a group consisting of polyester, epoxy, amine and silicon.

6. The fuel cell power generation system of claim 1, wherein the heat transfer tape blocks thermal conduction in a direction of thickness.

7. The fuel cell power generation system of claim 1, wherein the heat transfer tape comprises graphite.

8. The fuel cell power generation system of claim 1, further comprising a heat blocking layer on an opposite surface of a surface of the heat transfer tape being in contact with the stack or the hydrogen tank.

* * * * *